United States Patent
Quirk et al.

(10) Patent No.: US 10,778,602 B2
(45) Date of Patent: Sep. 15, 2020

(54) PEER NEGOTIATION OF AREA SERVICE PREFERENCES

(71) Applicant: International Business Machines Corporation, Armonk, NY (US)

(72) Inventors: Aaron J. Quirk, Durham, NC (US); Lin Sun, Research Triangle Park, NC (US); Laura Wynter, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 14/450,676

(22) Filed: Aug. 4, 2014

(65) Prior Publication Data
US 2016/0036904 A1    Feb. 4, 2016

(51) Int. Cl.
*G06F 15/16* (2006.01)
*H04L 12/919* (2013.01)
*H04L 29/08* (2006.01)

(52) U.S. Cl.
CPC ........ *H04L 47/765* (2013.01); *H04L 67/1046* (2013.01); *H04L 67/16* (2013.01); *H04L 67/24* (2013.01)

(58) Field of Classification Search
CPC .... H04W 4/005; H04W 28/22; H04L 67/104; H04L 47/765; H04L 67/1046; H04L 67/16; H04L 67/24
USPC ........................................... 709/204
See application file for complete search history.

(56) References Cited

U.S. PATENT DOCUMENTS

| | | | |
|---|---|---|---|
| 6,530,083 | B1 | 3/2003 | Liebenow |
| 2006/0123080 | A1 | 6/2006 | Baudino et al. |
| 2007/0143482 | A1 | 6/2007 | Zancho |
| 2009/0024686 | A1* | 1/2009 | Nass .................. H04L 12/2803 709/201 |
| 2010/0082176 | A1* | 4/2010 | Chang ...................... H02J 3/14 700/295 |
| 2010/0306249 | A1 | 12/2010 | Hill et al. |
| 2011/0140924 | A1 | 6/2011 | Sennett et al. |
| 2012/0166583 | A1 | 6/2012 | Koonce et al. |
| 2013/0024940 | A1 | 1/2013 | Hutchins |
| 2013/0053012 | A1 | 2/2013 | Dhodapkar |
| 2014/0084165 | A1 | 3/2014 | Fadell et al. |

(Continued)

FOREIGN PATENT DOCUMENTS

CN    203535770 U    4/2014

OTHER PUBLICATIONS

Anwitaman Datta, "MobiGrid: Peer-to-Peer Overlay and Mobile Ad-Hoc Network Rendezvous—a Data Management Perspective," Conference on Advanced Information Systems Engineering (CAiSE) Doctoral Symposium Proceedings, 2003, 12 pages, Klagenfurt/Velden Austria.

(Continued)

*Primary Examiner* — Sm A Rahman
(74) *Attorney, Agent, or Firm* — Donald J. O'Brien

(57) ABSTRACT

Methods and systems may provide for joining an overlay network of a plurality of peer devices and identifying a local preference for an area service available to the plurality of peer devices. Additionally, the local preference may be used to negotiate a common preference for the area service with the plurality of peer devices. In one example, the common preference is a best fit value for the plurality of peer devices on the overlay network.

14 Claims, 2 Drawing Sheets

(56) References Cited

U.S. PATENT DOCUMENTS

| | | |
|---|---|---|
| 2014/0108486 A1 | 4/2014 | Borzycki et al. |
| 2014/0223019 A1* | 8/2014 | McCann ............... H04W 8/186 |
| | | 709/228 |
| 2016/0036925 A1 | 2/2016 | Quirk et al. |

OTHER PUBLICATIONS

Sensorcon, "Sensordrone: The 6th Sense of Your Smartphone . . . & Beyond!," Kickstarter.com, retrieved Apr. 22, 2014, 16 pages, Buffalo, NY.

List of IBM Patents or Patent Applications Treated as Related, May 30, 2015, 1 page.

Office Action for U.S. Appl. No. 14/726,202, dated Jul. 18, 2016, 16 pages.

Office Action for U.S. Appl. No. 14/726,202, dated Oct. 27, 2016, 12 pages.

Office Action for U.S. Appl. No. 14/562,457, dated Jan. 5, 2018, 17 pages.

Unknown, Remote Inspection Shaft Monitoring System Based on IoT (Interivew of Things) Technology, Apr. 9, 2014, 4 pages.

Office Action for U.S. Appl. No. 14/726,202, dated May 23, 2019, 8 pages.

* cited by examiner

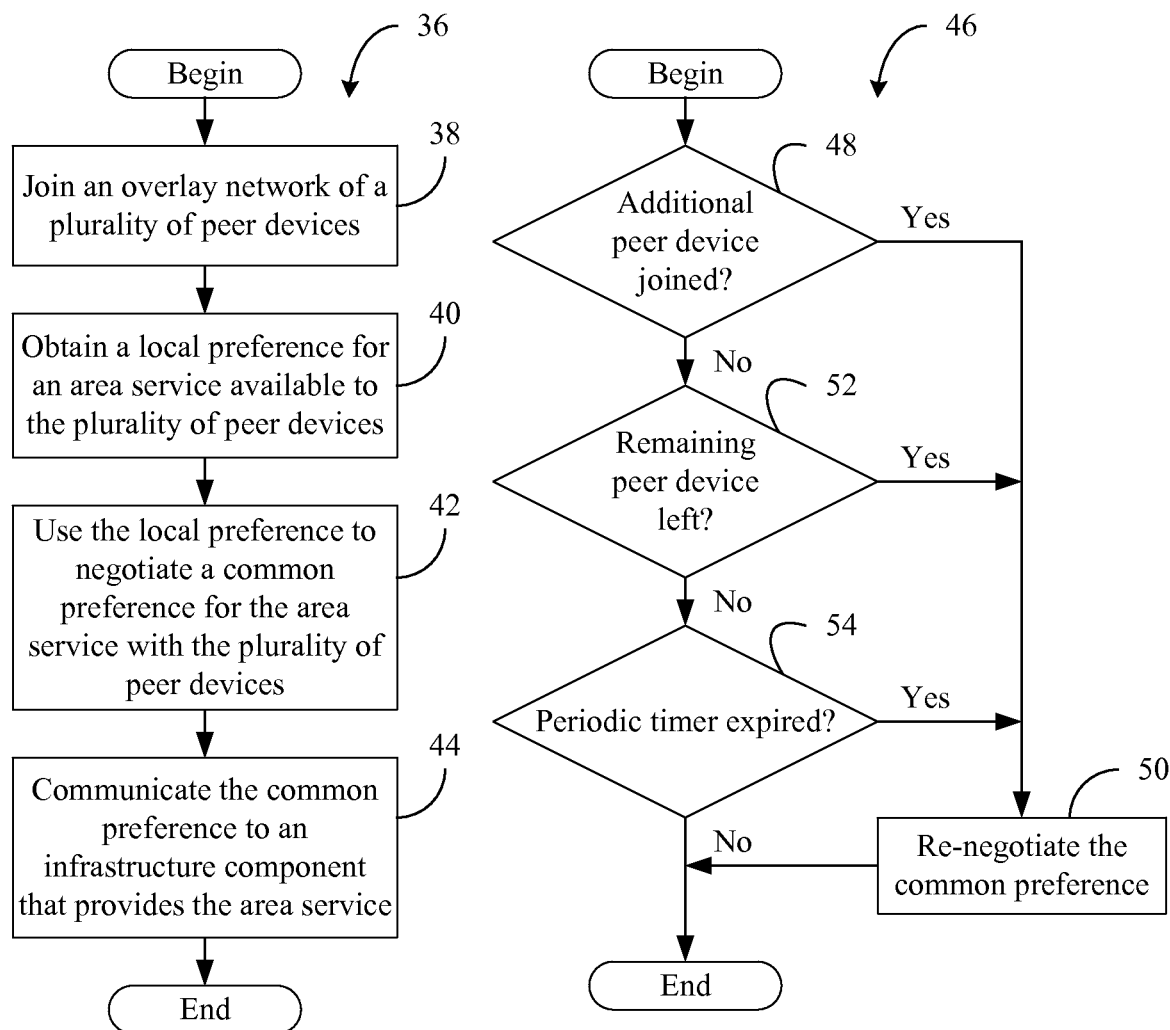
FIG. 2  FIG. 3
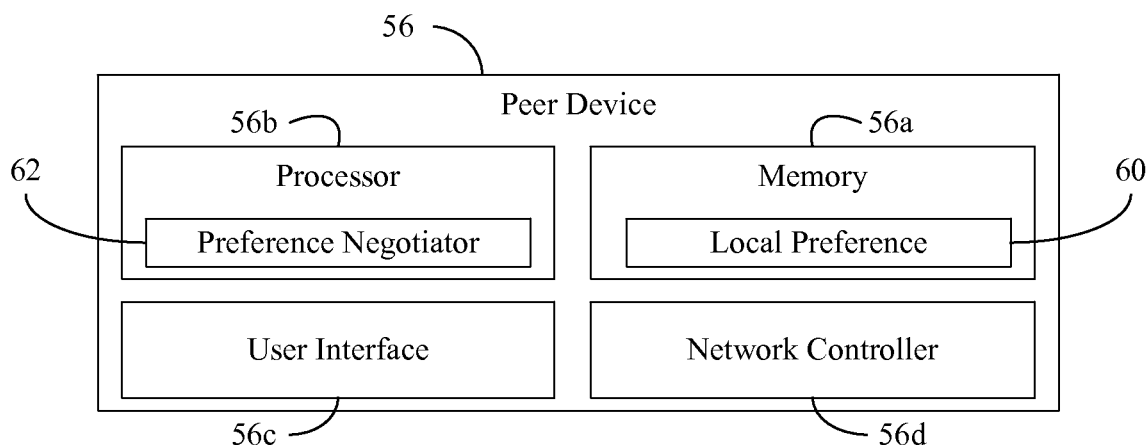
FIG. 4

PEER NEGOTIATION OF AREA SERVICE PREFERENCES

BACKGROUND

Embodiments of the present invention generally relate to the delivery of services to disparate devices gathered in a common area. More particularly, embodiments relate to peer negotiation of area service preferences.

With the growing popularity of mobile devices such as smart phones and tablet computers, ad hoc gatherings of individuals carrying disparate mobile devices to common areas such as stores and restaurants may also occur more often. While recent attempts to control the temperature of common areas may have collected temperature preference information from the devices present in the common area in order to determine an average temperature setting for the area, there remains considerable room for improvement with respect to anonymity and privacy. For example, conventional approaches may involve the use of a centralized system that is able to positively identify the devices (e.g., and users of the devices) present in the common area as well as determine the individual preferences associated with each device/user.

BRIEF SUMMARY

Embodiments may also include a method of operating a local peer device, comprising joining an overlay network of a plurality of peer devices, identifying a local preference for an area service available to the plurality of peer devices and using the local preference to negotiate a common preference for the area service with the plurality of peer devices.

Embodiments may also include a computer program product to negotiate preferences, the computer program product comprising a computer readable storage medium having program instructions embodied therewith, the program instructions executable by a local peer device to cause the local peer device to join an overlay network of a plurality of peer devices, identify a local preference for an area service available to the plurality of peer devices, and use the local preference to negotiate a common preference with the area service with the plurality of peer devices.

Embodiments may include a computer program product to negotiate preferences, the computer program product comprising a computer readable storage medium having program instructions embodied therewith, the program instructions executable by a local peer device to cause the local peer device to join an overlay network of a plurality of peer devices, obtain a local preference for an area service available to the plurality of peer devices from one or more of a user interface of the local peer device or a profile stored on the local peer device, use the local preference to negotiate a common preference for the area service with the plurality of peer devices, wherein the common preference is to be a best fit value for the plurality of peer devices on the overlay network, communicate the common preference to an infrastructure component that provides the area service, and re-negotiate the common preference in response to one or more of an additional peer device joining the overlay network, a remaining peer device leaving the overlay network or an expiration of a periodic timer.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 2 is a flowchart of an example of a method of operating a local peer device according to an embodiment;

FIG. 3 is a flowchart of an example of a method of re-negotiating a common preference according to an embodiment; and FIG. 4 is a block diagram of an example of a peer device according to an embodiment.

DETAILED DESCRIPTION

Figure 1:
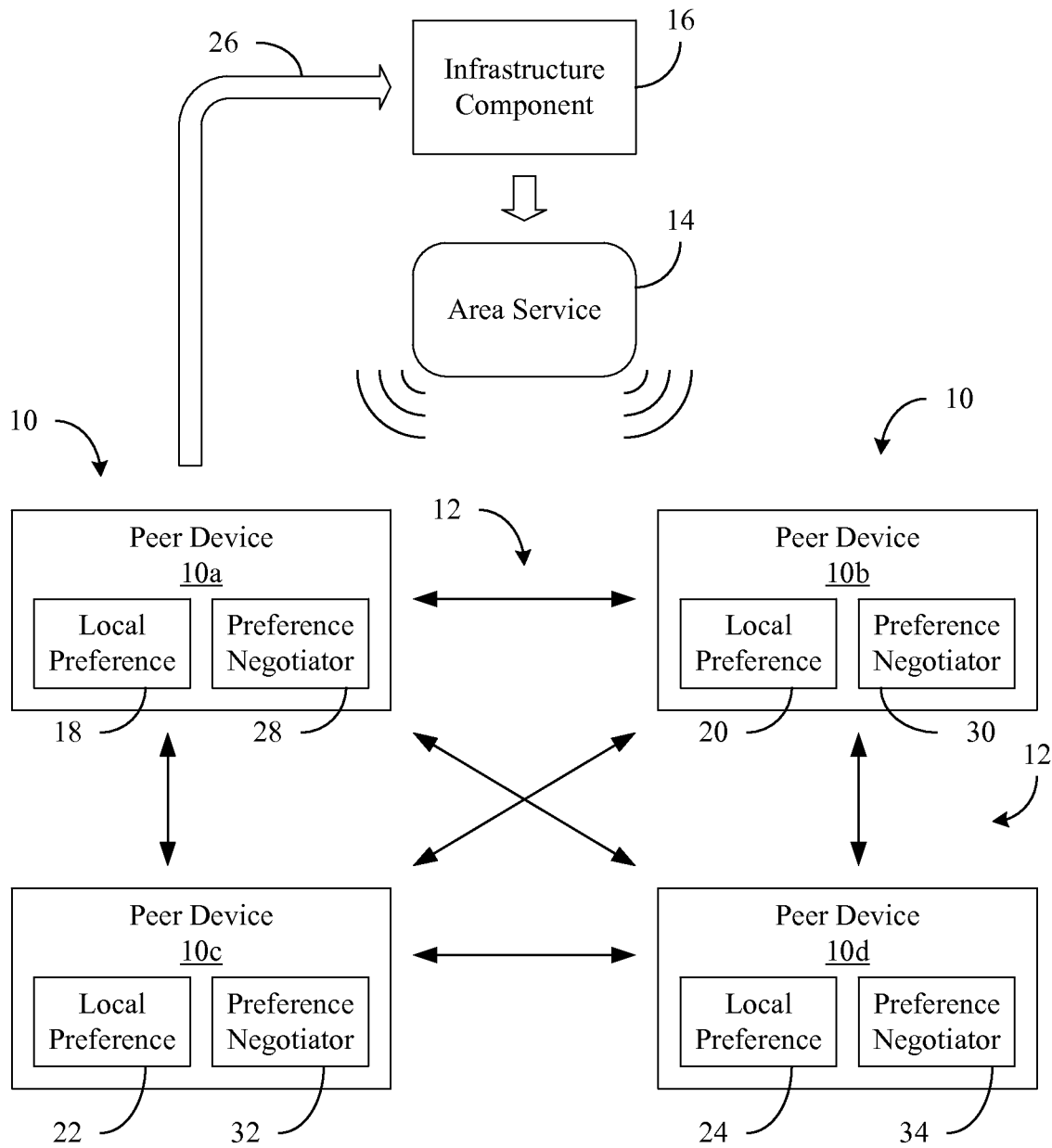
FIG. 1 is a block diagram of an example of an area service that is available to a plurality of peer devices according to an embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Turning now to FIG. 1, a plurality of peer devices 10 (10a-10d) is shown, wherein the illustrated peer devices 10 conduct one or more peer-to-peer communications 12 in order to join and participate in an overlay (e.g., mesh) network. In the illustrated example, the peer devices 10 are located in a common area (e.g., crosswalk, intersection, community pool, store) that receives an area service 14 provided by an infrastructure component 16 such as, for example, a crosswalk timer, public safety staffing system, temperature control system, ambient lighting control system, jukebox, and so forth. In the illustrated example, each peer device 10 includes a local preference for the area service 14, wherein the local preferences may differ from one peer device 10 to another.

For example, if the infrastructure component 16 is a crosswalk controller (e.g., located at a busy intersection of Main Street and First Street) that controls pedestrian walk signals as the area service 14, a first peer device 10a may have a local preference 18 that specifies a particular crossing direction (e.g., cross First Street heading northbound on Main Street from the southwest corner of the intersection, based on an active navigation route) while the pedestrian carrying the first peer device 10a stands at or approaches that particular corner of the intersection. A second peer device 10b, on the other hand, might have another local preference 20 that specifies a different crossing direction (e.g., cross Main Street heading eastbound on First Street from the southwest corner of the intersection) while a different pedestrian carrying the second peer device 10b stands at or approaches that corner of the intersection. As will be discussed in greater detail, the peer devices 10 may use the local preferences 18, 20 to negotiate a common preference 26 for the area service 14 that represents a best fit value for the peer devices 10 and communicate the common preference 26 to the infrastructure component 16 that provides the area service 14.

Thus, in the above example, a preference negotiator 28 of the first peer device 10a and a preference negotiator 30 of the second peer device 10b may exchange their respective local preferences 18, 20 and agree upon a particular crosswalk timer setting that represents a compromise (e.g., northbound pedestrian traffic receives the "walk" sign for 15 s instead of 30 s, then eastbound pedestrian traffic receives the walk sign). The negotiated common preference 26 may be communicated to the infrastructure component 16 without revealing the identity of either the first peer device 10a or the second peer device 10b (e.g., by designating the overlay network as the sender). Moreover, because the illustrated common preference 26 is negotiated among the peer devices 10, the infrastructure component 16 may be prevented from determining either of the individual local preferences 18, 20 or their association with the first and second peer devices 10a, 10b, respectively. The illustrated approach therefore maintains both the anonymity and privacy of the peer devices 10 and the users carrying the peer devices 10.

Additionally, the common preference 26 may be re-negotiated as additional peer devices join the overlay network, as remaining peer devices leave the overlay network and/or when a periodic timer expires. For example, if a third peer device 10c joins the overlay network, a preference negotiator 32 may use a local preference 22 to re-negotiate the common preference 26 with the remaining peer devices 10 on the overlay network. Similarly, if a fourth peer device 10d joins the overlay network, a preference negotiator 34 may use a local preference 24 to re-negotiate the common preference 26 with the remaining peer devices 10 on the overlay network. Thus, in the case of a crosswalk controller, the addition of the third and fourth peer devices 10c, 10d to the overlay network may result in the crosswalk timer setting being adjusted to reflect the presence of additional pedestrians at the intersection in question (e.g., and their respective travel routes) so that the area service 14 better meets the needs of the recipients of the service 14.

Other examples of the illustrated area service 14 enable the peer devices 10 to negotiate settings such as, for example, public safety staffing levels (e.g., lifeguards, paramedics, etc., based on individual swimming abilities of a large group), temperature settings, lighting settings, music genre settings, listening volume settings, and so forth. Additionally, the local preferences 18, 20, 22, 24 may be obtained from user interfaces (not shown) of the peer devices 10, profiles stored on the peer devices 10, etc., or any combination thereof. There may also be multiple local preferences associated with each peer device 10 depending on the circumstances. Moreover, the peer devices 10 may include any type of handheld or mobile device such as, for example, smart phones, tablet computers, personal digital assistants (PDAs), media players, etc., or any combination thereof. In the illustrated example, the first peer device 10a is the leader of the overlay network and communicates the common preference 26 to the infrastructure component 16, although any other peer device 10 may serve as the network leader. Indeed, the first peer device 10a may also delegate that functionality to another peer device 10 in the overlay network if appropriate.

FIG. 2 shows a method 36 of operating a local peer device such as, for example, one or more of the peer devices 10 (FIG. 1), already discussed. Illustrated processing block 38 provides for joining an overlay network of a plurality of peer devices, wherein a local preference for an area service available to the plurality of peer devices may be obtained at block 40. The local preference may be obtained based on service information broadcasted (e.g., via wireless transmission) to a common area such as, for example, a crosswalk, intersection, community pool and/or store. For example, block 40 might include determining that a particular service is available and searching the local peer device (or prompting a user of the local peer device) for relevant preference information (e.g., a local preference). Thus, the local preference might be obtained from a user interface of the local peer device and/or a profile stored on the local peer device.

Block 42 may use the local preference to negotiate a common preference for the area service with the plurality of peer devices. Block 42 may therefore involve, sending the local preference from the local peer device to one or more remaining peer devices on the overlay network, receiving one or more remote preferences from one or more remaining peer devices on the overlay network, comparing the one or more remote preferences to the local preference, etc., or any combination thereof. As already noted, the common preference may be a best fit value for the plurality of peer devices on the overlay network. Block 42 may also involve prioritizing and/or weighting one or more preferences published to the overlay network. Illustrated block 44 communicates (e.g., wired, wirelessly) the common preference to an infrastructure component that provides the area service. The local preference and the common preference may include, for example, a crosswalk timer setting, a public safety staffing level, a temperature setting, a light setting, a music genre setting, a listening volume setting, etc.

Turning now to FIG. 3, a method 46 of re-negotiating a common preference is shown. The method 46 may be implemented in a local peer device such as, for example, one or more of the peer devices 10 (FIG. 1), already discussed. Illustrated processing block 48 may determine whether an additional peer device has joined an overlay network. If so, the common preference may be re-negotiated at block 50. Re-negotiation of the common preference may include, for example, sharing/publishing local preferences to other peer devices on the overlay network. If no additional peer devices have joined the overlay network, a determination may be made at block 52 as to whether a remaining peer device has left the overlay network. If so, the common preference may be re-negotiated at block 50, as already discussed. If no remaining peer devices have left the overlay network, illustrated block 54 determines whether a periodic timer has expired. If so, the common preference may be re-negotiated at block 50. The illustrated method 46 terminates if either the periodic timer has not expired or the re-negotiation of the common preference is complete. The blocks 48, 52, 54 may be performed in an order different than the order shown and/or in parallel.

FIG. 4 shows a peer device 56 (56a-56d) that may be used to negotiate preferences. The peer device 56 may readily be substituted for one or more of the peer devices 10 (FIG. 1), already discussed. In the illustrated example, a memory 56a (e.g., non-volatile memory/NVM, volatile memory) stores a local preference 60, which may include, for example, a crosswalk timer setting, a public safety staffing level, a temperature setting, a light setting, a music genre setting, a listening volume setting, etc. The peer device 56 may also obtain the local preference 60 from, for example, a user interface 56c (e.g., touch screen, keypad, keyboard, microphone, mouse), a user profile (not shown), etc., or any combination thereof. The peer device 56 may also include a processor 56b configured to execute a preference negotiator 62 (e.g., as hardware circuitry, configurable logic and/or program instructions) that joins an overlay network of a plurality of peer devices, identifies the local preference 60 for an area service and uses the local preference 60 to negotiate a common preference for the area service with the plurality of peer devices. In one example, the peer device 56 uses a network controller 56d to conduct the negotiation with the other peer devices and/or communicate the common preference to the infrastructure component.

Techniques described herein may therefore ensure privacy by enabling mobile device users to avoid sharing specific preferences directly with an infrastructure and ensure anonymity by enabling mobile device users to prevent a particular preference from being associated with their device. Additionally, the overlay network may enable peer devices to join without registering to further enforce privacy and anonymity.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer program product to negotiate preferences, the computer program product comprising a non-transitory computer readable storage medium having program instructions embodied therewith, the program instructions executable by a local peer device to cause the local peer device to:
   join an overlay network of a plurality of peer devices;
   obtain a local preference for an area service available to the plurality of peer devices from one or more of a user interface of the local peer device or a profile stored on the local peer device;
   use the local preference to negotiate a common preference for the area service with the plurality of peer devices, wherein the common preference is to be a best fit value for the plurality of peer devices on the overlay network;
   communicate the common preference to an infrastructure component that provides the area service; and
   re-negotiate the common preference among the plurality of peer devices in response to an expiration of a periodic timer.

2. The computer program product of claim 1, wherein the program instructions are executable to cause the local peer device to send the local preference from the local peer device to one or more remaining peer devices on the overlay network.

3. The computer program product of claim 1, wherein the program instructions are executable to cause the local peer device to:
   receive one or more remote preferences from one or more remaining peer devices on the overlay network; and
   compare the one or more remote preferences to the local preference.

4. The computer program product of claim 1, wherein the local preference and the common preference are to include one or more of a crosswalk timer setting, a public safety staffing level, a temperature setting, a lighting setting, a music genre setting or a listening volume setting.

5. A computer program product to negotiate preferences, the computer program product comprising a non-transitory computer readable storage medium having program instructions embodied therewith, the program instructions executable by a local peer device to cause the local peer device to:
   join an overlay network of a plurality of peer devices;
   receive service information broadcasted to an area;
   identify, based on the broadcasted service information, a local preference for an area service available to the plurality of peer devices;
   use the local preference to negotiate a common preference for the area service with the plurality of peer devices; and
   re-negotiate the common preference among the plurality of peer devices in response to an expiration of a periodic timer.

6. The computer program product of claim 5, wherein the common preference is to be a best fit value for the plurality of peer devices on the overlay network.

7. The computer program product of claim 5, wherein the program instructions are executable to cause the local peer device to send the local preference from the local peer device to one or more remaining peer devices on the overlay network.

8. The computer program product of claim 5, wherein the program instructions are executable to cause the local peer device to:
   receive one or more remote preferences from one or more remaining peer devices on the overlay network; and
   compare the one or more remote preferences to the local preference.

9. The computer program product of claim 5, wherein the program instructions are executable to cause the local peer device to obtain the local preference from one or more of a user interface of the local peer device or a profile stored on the local peer device.

10. The computer program product of claim 5, wherein the program instructions are executable to cause the local peer device to communicate the common preference to an infrastructure component that provides the area service.

11. The computer program product of claim 5, wherein the program instructions are further executable to cause the local peer device to re-negotiate the common preference in response to one or more of an additional peer device joining the overlay network, or a remaining peer device leaving the overlay network.

12. The computer program product of claim 5, wherein the local preference and the common preference are to include one or more of a crosswalk timer setting, a public safety staffing level, a temperature setting, a lighting setting, a music genre setting or a listening volume setting.

13. The computer program product of claim 1, wherein re-negotiating the common preference is to include the local peer device sharing the local preference with other peer devices on the overlay network.

14. The computer program product of claim 5, wherein re-negotiating the common preference is to include the local peer device sharing the local preference with other peer devices on the overlay network.

* * * * *